United States Patent
Inoue et al.

(10) Patent No.: US 7,337,592 B2
(45) Date of Patent: Mar. 4, 2008

(54) POROUS POLY(VINYL ACETAL) RESIN BODY HAVING A HIGH DEGREE OF CLEANLINESS, A PROCESS OF PREPARING THE SAME, AND A METHOD OF STORING THE SAME

(75) Inventors: Jun Inoue, Ibaraki (JP); Yasuoki Sasaki, Ibaraki (JP); Megumi Tanno, Ibaraki (JP)

(73) Assignee: Aion Co., Ltd., Osaka (JP)

( * ) Notice: Subject to any disclaimer, the term of this patent is extended or adjusted under 35 U.S.C. 154(b) by 212 days.

(21) Appl. No.: 11/144,859

(22) Filed: Jun. 3, 2005

(65) Prior Publication Data
US 2006/0000191 A1   Jan. 5, 2006

Related U.S. Application Data

(60) Division of application No. 10/167,850, filed on Jun. 12, 2002, now abandoned, which is a continuation-in-part of application No. 09/554,839, filed as application No. PCT/JP97/04249 on Nov. 21, 1997, now abandoned.

(30) Foreign Application Priority Data
Nov. 20, 1997 (JP) .................... 9/337701

(51) Int. Cl.
B65B 11/58    (2006.01)
B65B 31/04    (2006.01)

(52) U.S. Cl. .......................... 53/449; 53/403

(58) Field of Classification Search .................. 53/403, 53/410, 411, 428, 432, 449, 467; 206/524.1, 206/524.4, 204, 525.1
See application file for complete search history.

(56) References Cited

U.S. PATENT DOCUMENTS

| | | | | |
|---|---|---|---|---|
| 3,815,315 A | * | 6/1974 | Glick | 53/425 |
| 4,588,400 A | * | 5/1986 | Ring et al. | 604/304 |
| 4,852,732 A | * | 8/1989 | Wilski et al. | 206/204 |
| 4,998,400 A | * | 3/1991 | Suzuki et al. | 53/425 |
| 5,071,648 A | * | 12/1991 | Rosenblatt | 424/78.06 |
| 5,119,133 A | * | 6/1992 | Swain | 399/163 |
| 5,260,023 A | * | 11/1993 | Evans, II | 422/40 |
| 5,391,420 A | * | 2/1995 | Bootman et al. | 424/480 |
| 5,527,534 A | * | 6/1996 | Myhling | 424/430 |
| 5,556,391 A | * | 9/1996 | Cercone et al. | 604/369 |
| 6,076,662 A | * | 6/2000 | Bahten | 206/207 |
| 6,711,879 B2 | * | 3/2004 | Korteweg et al. | 53/431 |
| 6,802,099 B2 | * | 10/2004 | Murakami et al. | 15/102 |

* cited by examiner

Primary Examiner—Rinaldi I. Rada
Assistant Examiner—Paul Durand
(74) Attorney, Agent, or Firm—Oliff & Berridge, PLC

(57) ABSTRACT

A process of preparing and a method of storing porous poly(vinyl acetal) resin body. A method of storing the porous body involves keeping the porous body wet and free of contamination with organic substances, dissolved ions, and other fine particles. The storing method also involves keeping the body free of mold and avoiding pre-cleaning after a prolonged period of storage.

12 Claims, 3 Drawing Sheets

POROUS POLY(VINYL ACETAL) RESIN BODY HAVING A HIGH DEGREE OF CLEANLINESS, A PROCESS OF PREPARING THE SAME, AND A METHOD OF STORING THE SAME

CROSS REFERENCE TO RELATED APPLICATIONS

This application is a division of application Ser. No. 10/167,850 filed Jun. 12, 2002 now abandoned, which is a continuation-in-part of U.S. Ser. No. 09/554,839 filed May 19, 2000 now abandoned, all of which are incorporated by reference herein. U.S. Ser. No. 09/554,839 is a national stage application of PCT/JP97/04249 with an international filing date of Nov. 21, 1997.

FIELD OF THE INVENTION

This invention relates to a porous poly(vinyl acetal) resin body and a process of preparing the same, and a method of storing the same, more specifically, the method of preparing and storing the porous body in a state where the body is wet and is free of contamination with organic substances, dissolved ions, and fine particles and free of contamination with a free minor raw material and a major raw material, i.e., poly(vinyl alcohol)added in the production processes of the porous poly(vinyl acetal) resin body, and agents added for the purposes of pasteurizing and mold-proofing the porous poly(vinyl acetal) resin body.

BACKGROUND OF THE INVENTION

A porous poly(vinyl acetal) resin body is well known as a material having excellent water-absorbing and water-holding properties and showing, in a wet state, a desirable flexibility and an impact strength. With these properties, the porous poly(vinyl acetal) resin body is widely used as an optimum material for cleaning tools and wipers. Especially, because the body has a hydrophilic property and an excellent cleaning capability, and nevertheless does not damage objects scrubbed and, in addition, is excellent in strength, it has wide industrial applications such as cleaning of clean rooms, semiconductors, and electronic parts, and also plays an important role as a water absorbent material.

The porous poly(vinyl acetal) resin body herein is also called poly(vinyl acetal) sponge and will be abbreviated as "PVAt sponge" hereinafter.

A PVAt sponge is the most suitable material for cleaning clean rooms. To realize this advantage, the PVAt sponge should generally be used in a wet state, because the PVAt sponge hardens and loses its softness and elasticity, when dried. A water absorption rate of a porous PVAt body in a dry state is very different from that in a wet state, with the former being significantly slower than the latter. It takes much time to change the sponge from a dry state to a wet state, and therefore, it is practically preferred to keep it wet without drying it.

However, the porous PVAt type body tends to get moldy when kept wet for a long time. Mold causes problems in regard of hygiene, appearance and handling and, therefore, it is necessary to provide a porous PVAt type body with a mold-proofing property.

In storing the PVAt sponge, contamination of the porous body with organic substances, ionic substances, fine particles, and microorganisms shall be prevented. Especially in applications in the semiconductor industry, these contaminants should be reduced to the lowest possible limit. In a conventional method of storing the PVAt sponge, the sponge is impregnated with an agent having mold-proofing and pasteurizing properties, such as an aqueous solution of sodium dehydroacetate, 4-chloro-3, 5-dimethylphenol, benzalconium chloride, and benzimidazol.

However, when the PVAt sponge treated with a solution comprising those agents and stored is used as such for cleaning semiconductors or the like, these agents are eluted in cleaning water, i.e., ultra-pure water used for and contaminate the cleaning water and subjects to be cleaned. To remove these agents from the PVAt sponge treated with a solution comprising those agents and stored, the PVAt sponge is usually subjected to a long time of pre-cleaning before used.

In addition, when a PVAt sponge is treated with those agents and stored, the porous body is changed in qualities or degraded by the effects of some agents, which is also a problem.

Particularly, when a PVAt sponge is used as a cleaning material in the semiconductor industry or used as a water absorbent material in the electronics industry, for example, cleaning materials for precision cleaning of silicon wafers and photomasks, or for cleaning of printed circuit boards and lead frames or used as a water absorbent, foreign elements eluted from the PVAt sponge not only degrade qualities of products but also contaminate the production systems and environment itself, causing a huge damage. Thus, in applications in clean rooms or in an environment with a highly controlled cleanliness, the foreign elements originated from the porous body should be reduced extremely, but the above-mentioned storing method using agents could not meet this requirement.

To deal with these problems, the following methods may be thought: autoclave pasteurization under heat and pressure; pasteurization with an oxidizing gas such as ethylene oxide and ozone; storing a product in a sealed container and replacing a gas in the container with an inert gas; and pasteurization with UV light. For other materials than the PVAt sponge, an appropriate method was properly selected and applied among those methods. However, none of the methods is suitable to the PVAt sponge. For example, in the autoclave pasteurization, the material itself shrinks and loses its softness and elasticity, peculiar to the PVAt sponge. In the pasteurization with an oxidizing gas, it is difficult for the gas to penetrate deeply into the porous body and the porous body itself tends to deteriorate by oxidation. In the method where a product is stored in a sealed container and a gas in the container is replaced with an inert gas, it is not easy to remove oxygen dissolved in water adhered on the porous body and in the body itself and, consequently, mold growth cannot be prevented completely. The method utilizing UV light is not practical because UV light affects only the surface of the porous body.

As a result of intensive researches, the present inventor have found that, it is possible to prevent mold growth during prolonged storage of a PVAt sponge in a wet state and to avoid elution of substances or rising of dusts from the PVAt sponge in use after the storage to thereby reduce or eliminate a pre-cleaning process before use. The purpose of the present invention is to provide a PVAt sponge having a high degree of cleanliness, a method of preparing the same and a method of storing the same which allows strict preservation and easy handling of the cleanliness of the PVAt sponge having a high degree of cleanliness.

DISCLOSURE OF THE INVENTION

The present inventions are a PVAt sponge having a high degree of cleanliness, a method of preparing a PVAt sponge having a high degree of cleanliness by cleaning the PVAT sponge with pure water from which foreign substances dissolved or floating in water such as particles, ions and organic substances have been removed, and a method of storing the same by hermetically packaging the thus prepared PVAt sponge having a high degree of cleanliness as a whole together with an oxygen absorbent with an oxygen barrier film.

The present PVAt sponge with a high degree of cleanliness is characterized by such cleanliness that the porous body shows a COD (Chemical Oxygen Demand) of 5 ppm or less and a concentration of sodium ions of 1 ppm or less; and further the porous body shows a conductivity of less than 5 μS/cm, and the number of particles having a size of 2.5 μm or larger is at most 50,000/cc of the porous body.

The present sponge with a high degree of cleanliness allows one to reduce or eliminate conventionally required pre-cleaning, for example, a thorough cleaning to prevent foreign substances from being eluted, before used in a washing step in a clean room. Further, by increasing the degree of cleanliness, the sponge can be used in severer environmental conditions such as those in a semiconductor production process.

The present method of preparing the PVAt sponge with a high degree of cleanliness is characterized by cleaning the sponge with pure water from which foreign substances dissolved or floating in water such as particles, ions and organic substances have been removed, and also characterized in that the pure water used for cleaning has a conductivity of 0.1 μS/cm or lower and COD of 1 ppm or less.

The above-mentioned cleaning with pure water is preferably carried out in an environment where a higher degree of cleanliness than Class 100 specified in the Federal Standards 209D is maintained.

The present method for the preparation enables one to prepare a sponge with a high degree of cleanliness. By increasing the degree of cleanliness of pure water used for the preparation, it is possible to prepare a PVAt sponge with a higher degree of cleanliness which can be used in severer environmental conditions such as those in a semiconductor production process.

By increasing the degree of cleanliness of an environment where the cleaning is performed, one can prepare a sponge with a higher degree of cleanliness which can be used even when severer quality is required.

The present method of storing a sponge with a high degree of cleanliness is characterized by hermetically packaging the whole PVAt sponge prepared with a high degree of cleanliness with an oxygen barrier film together with an oxygen absorbent.

By storing an PVAt with a high degree of cleanliness together with an oxygen absorbent in a closed package having an oxygen-blocking property to thereby keep the inside of the package in an oxygen-free state or in a nearly oxygen-free state with a low oxygen concentration according to the present storing method, one can strictly maintain the cleanliness of the sponge with a high degree of cleanliness without a mold-proofing agent and also reduce or eliminate the time required for a pretreatment before use.

The above-mentioned oxygen barrier film is characterized by an oxygen permeability of 200 cc/m²·atm·24 hrs or smaller. Using a material having such an excellent oxygen blocking property produces a state with a low oxygen concentration which is almost oxygen free.

Preferably, an oxygen detecting agent is contained in the hermetic package. By using this manner of packaging, one can detect the presence of oxygen in case, for example, where the package is partly torn to break the seal, to thereby prevent erroneous use of an inferior product.

A method of increasing the degree of cleanliness for storing a PVAt sponge with a high degree of cleanliness is characterized by hermetically packaging the PVAt sponge with a high degree of cleanliness, and then irradiating the package with an electron beam or γ-ray. This method can strictly maintain the cleanliness of the sponge with a high degree of cleanliness without a mold-proofing agent. Further, less mold grows even in the presence of oxygen because the PVAt sponge is pasteurized by the irradiation with an electron beam or γ-ray. Accordingly, any packaging material can be used as long as it can make hermetic package. A method of storing a sponge with a high degree of cleanliness is provided which sponge can be used with very simple pretreatment before use.

By setting an irradiation dosage of an electron beam or γ-ray to 10 kGy or smaller, changes in physical properties of the sponge can be suppressed to be extremely small. If the irradiation dosage is larger, a compression stress of the sponge, for instance, increases, and thus the sponge becomes harder.

Preferably, an oxygen content in the sealed package is made low before the irradiation with an electron beam or γ-ray. This is because the electron beam or γ-ray irradiation activates oxygen and the activated oxygen may degrade the sponge. Therefore, it is preferred to hermetically package the sponge together with an oxygen absorbent with an oxygen barrier film. Further, an oxygen permeability of the oxygen barrier film is preferably 200 cc/m²·atm·24 hrs or smaller. By doing so, the oxygen content in the package can be kept extremely low and changes in physical properties of the sponge can be suppressed further.

Preferably, the sponge is covered with a molded sheet article before packaged. This prevents the sponge from deforming when an internal pressure in the package become sub-atmospheric by an oxygen absorbent. Also it prevents deformation by an external pressure. Further preferred is double packaging by covering the hermetic package with a film. This allows one to reduce contamination of an environment where the sponge is used, just by discarding the outer package when using the sponge.

The packaging process is more preferably carried out in an environment where a higher degree of cleanliness than Class 100 specified in the Federal Standards 209D is maintained. By packaging in such an environment, a higher degree of cleanliness required for the use in much severer requirement for environment can be maintained.

As described above, a PVAt sponge is widely used for cleaning applications in clean rooms, cleaning semiconductors, and cleaning electronic parts, and used as water absorbent. It is beneficial to apply the present sponge with a high degree of cleanliness, the present method of preparing the same and the method of storing the same to those applications and to a cleaning sponge roller.

DETAILED DESCRIPTION OF THE INVENTION

To explain the present invention in more detail, pure water used in the present invention preferably has such water quality that a conductivity at 25° C. is 0.1 μS/cm or lower, a COD is 1 ppm or less, the number of particles having a size of 0.3 μm or more is 100/ml or smaller, and the number of living germs is 10/ml or smaller, and more preferably has such water quality that a conductivity at 25° C. is 0.055 μS/cm or lower, a COD is 1 ppm or less, the number of particles having a size of 0.1 μm or more is 1/ml or smaller, and the number of living germs is 0.01/ml or smaller. By cleaning the PVAt sponge with the ultra-pure water having the above water quality, foreign elements adhered on the porous body are removed effectively. Such ultra-pure water can be prepared by normal filtration, by using a precision filtration membrane, an ultrafiltration membrane, a reverse osmosis membrane or a dialysis membrane, by ion exchanging, by distillation, or by any combination thereof.

The degree of cleanliness of the PVAt sponge obtained by cleaning with the above-mentioned ultra-pure water is such that a conductivity is less than 5 μS/cm, COD is 5 ppm or less, a sodium ion concentration is 1 ppm or lower, and the number of particles having a size of 2.5 μm or more is 50,000/cc or smaller. These figures are allowable for applications in the semiconductor industry.

The details of the measurement methods for these parameters will be described later in this specification.

For the oxygen barrier film, poly(vinylidene chloride), nylon, poly(vinyl acetate), poly(vinyl alcohol), aluminum foils, or aluminum deposited films can be preferably used. More preferably, films having an oxygen permeability of 10 $cc/m^2 \cdot atm \cdot 24$ hrs at 20-25° C. or lower are used. A laminated film consisting of two or more of these films having a high oxygen blocking property or a combination of the above-mentioned oxygen barrier film layered on a film such as a polyethylene, polyester, or polypropylene film are more preferred also for mechanical strength.

As the outer package for double packaging, an oxygen barrier film as that used for the inner package can be used, but an oxygen permeating film can be used such as widely used materials, such as polyethylene, polypropylene, polyester, and nylon. The purpose of this outer package is that even if a PVAt sponge which is taken out from a clean room and contaminated on its outer package, contamination on the package can be removed just by removing the outer package before taken in the clean room again to thereby prevent contamination of the clean room.

As the oxygen absorbent contained in the package made of a material with a high oxygen blocking property, substances which are chemically oxidized with ease can be used, for example, ascorbic acid, active metal powder, and sulfites, among which iron type substances are preferred in regard of their handling property, oxygen absorbing rate and oxygen absorbing capacity. It is more effective to use an oxygen absorbent in a form of fine powder to achieve a higher reactivity with oxygen. However, care should be taken not to bring the powder into contact with the porous material to be preserved. Generally, the oxygen absorbent fine powder is used with being wrapped in a material having smaller pores than a diameter of the oxygen absorbent and a gas permeability.

When stored in the above-mentioned manner, the PVAt sponge in the package can maintain for a long time the degree of cleanliness attained immediately after the cleaning with pure water.

There are some simple methods to remove oxygen in a package such as a vacuum packaging method and a method of degassing the inside of the package followed by filling the inside with an inert gas such as nitrogen or argon gas. However, it is difficult to remove oxygen present inside the porous material completely by those methods. Therefore, it is preferred to use the present method together with the methods.

To know whether oxygen exists in the package or not, it is effective to make the package to include a color-developing agent which reversibly changes its color depending upon the oxygen concentration. This facilitates it to know the oxygen concentration, so that more secure preservation of the products is achieved.

Irradiating the packaged PVAt sponge with an electron beam or gamma-ray sterilizes the PVAt sponge, so that mold growth can be prevented even when oxygen exists more or less. This means that any packaging material may be used satisfactorily as long as it can make a hermetic package and there is no need to use an oxygen barrier film. As a result, package and packaging procedure can be simplified.

According to the present method, a PVAt sponge prepared by reacting PVA with formalin is cleaned thoroughly with water for general use to wash away reaction residues, unreacted substances, and additives. Then, the sponge is soaked in pure water having the aforesaid quality and subjected to mechanical stretching and compression. Subsequently, water contained in the sponge is squeezed out sufficiently and then the sponge is allowed to absorb another pure water, followed by the above procedures.

Subsequently, the thus-cleaned PVAt sponge wet with pure water is covered as a whole with an oxygen barrier film and sealed completely. An oxygen absorbent is contained in the package together with the PVAt sponge. An oxygen detecting agent may also be contained. Alternatively, the whole PVAt sponge may be covered with a molded sheet article and then hermetically packaged as a whole with an oxygen barrier film.

Once the oxygen in the package is absorbed by the oxygen absorbent, the inner pressure in the package become sub-atmospheric, which causes the contained PVAt sponge to be deformed. If the deformation is kept for a long time, there may be a problem that the deformed part does not recover the original shape. This problem can be avoided by covering the whole PVAt sponge with a relatively hard, molded sheet article as described above.

Further, contamination of environment where a sponge is used can be further reduced by double-packaging a PVAt sponge packaged in an oxygen barrier film with a film, and discarding the outer package when the PVAt sponge is used.

To avoid contamination by elements which are contained together with the PVAt sponge in the package such as the aforesaid oxygen absorbent and oxygen detecting agent, it is preferred not to bring these elements into direct contact with the PVAt sponge by providing, for example, a structure to fix these elements in a part of the molded sheet article.

The present method can be applied not only to a porous material which hardens on drying but also to materials made of other polymers. For example, the present method can be applied to rubbery materials such as NBR and SBR and fibrous materials such as unwoven fabrics to prevent degradation of the materials themselves by oxidation or to preserve performances of agents added to the materials.

As described above, cleaning a PVAt sponge and storing the sponge according to the present invention allows one to store the porous body in a wet state for a long period of time without contamination by fine particles, organic substances, ions or the like and also without contamination by a mold-proofing agent.

Further, the present invention allows one to reduce or eliminate pre-cleaning which was conventionally practiced before using a PVAt sponge.

In addition, the PVAt sponge is stored in an oxygen-free atmosphere for a long time and consequently mold growth and quality change of the porous body itself by oxidation can be prevented. Further, the present method can be applied widely to materials of which degradation by oxidation and quality change must be prevented, besides porous materials or wet materials.

The method for determining the value of each parameter which represents the cleanliness will be explained below.

COD in ppm

Subject of measurement: a water sample is prepared by crumpling and squeezing 100 cc of a sponge 100 times in 400 cc of distilled water and then adjusting the volume of the water to 500 cc with distilled water.

Measurement method: the amount of potassium permanganate required to oxidize organic substances in the water sample is determined by coulometric titration and the amount is reduced to the equivalent amount of oxygen.

Measurement instrument: portable, speedy type COD meter, HC-507, ex Central Kagaku Co.

Conductivity in μS/cm

Subject of measurement: a water sample is prepared by squeezing a sponge which has been impregnated with a sufficient amount of deionized water and allowed to stand for about 3 minutes.

Measurement method: electrodes are immersed in the sample and a conductivity is measured in an AC bipolar method.

Measurement instrument: compact conductivity meter, B-173 type, ex Horiba Seisakusho Co.

Number of Particles in 1000/cc

Subject of measurement: a water sample is prepared by crumpling and squeezing 10 cc of a sponge 100 times in 800 cc of deionized water and then adjusting the volume of the water to 1000 cc with deionized water.

Measurement method: a size of each particle in 10 cc of the sample is determined by voltage drop caused by cut-off of halogen light and the number of the particle is counted in a particle counter of a light cut-off type. The number of the particles are indicated as that per cubic centimeter of the sponge.

Measurement instrument: HIAC/ROYCO, MODEL4100

Na Ion Concentration in ppm

Subject of measurement: a water sample is prepared by squeezing a sponge which has been impregnated with a sufficient amount of deionized water and allowed to stand for about 3 minutes.

Measurement method: the sample is dropped on a flat sensor of a sodium ion electrode.

Measurement instrument: Compact Ion meter, CANDY C-122, ex Horiba Seisakusho Co.

THE BEST MODE OF THE INVENTION

The present invention will be explained with reference to the following examples, but not limited to those Examples.

Example 1

Figure 1:
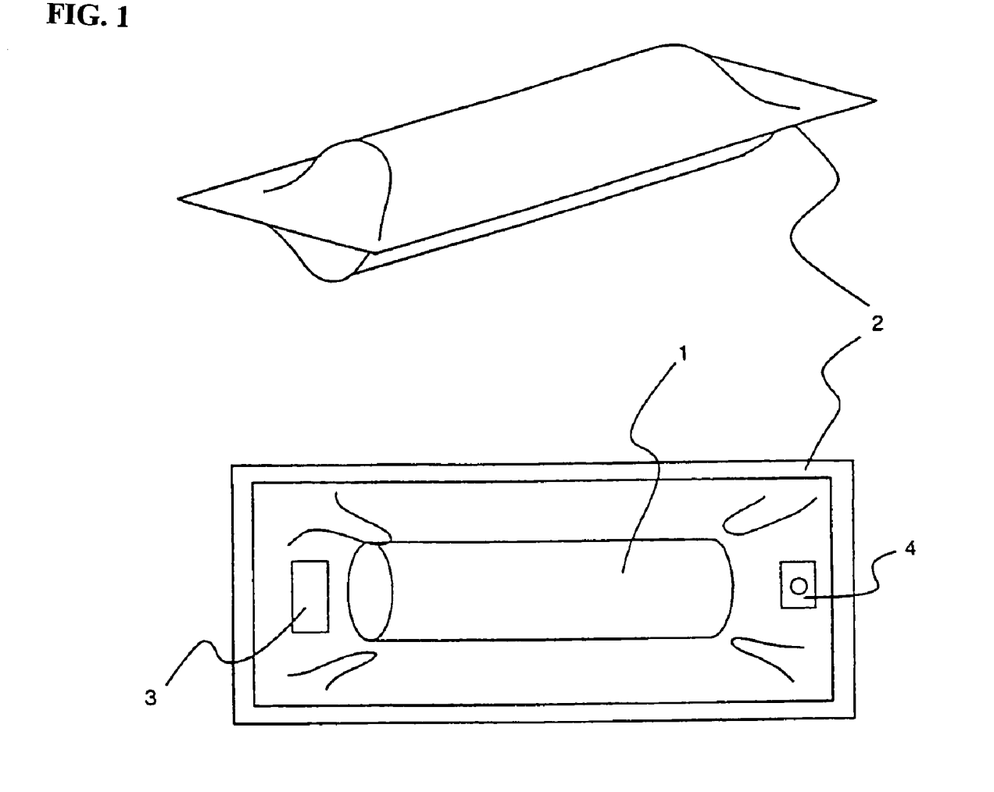
FIG. 1 is an illustrative view of the present storing method.

A sponge roller 1 made of poly(vinyl acetal) (PVAt) having an outer diameter of 60 mm, an inner diameter of 30 mm and a length of 254 mm was immersed in pure water having such water quality that its COD was 1 ppm, the conductivity at 25° C. was 0.06 μS/cm and the number of particles of 2.5 μ or bigger was 0/ml. In the water, the sponge was forced to be stretched and compressed mechanically. Then, water contained in the sponge was squeezed out to remove the washing water. By repeating the above procedure with fresh pure water 15 times, the sponge was cleaned. After this cleaning, the wet sponge roller was placed in a package 2 of 450 mm by 170 mm made of an oxygen barrier film as shown in FIG. 1, an oxygen absorbent 3 and an oxygen detecting agent 4 were introduced, and then the opening was heat sealed to thereby completely seal the package.

Figure 2:
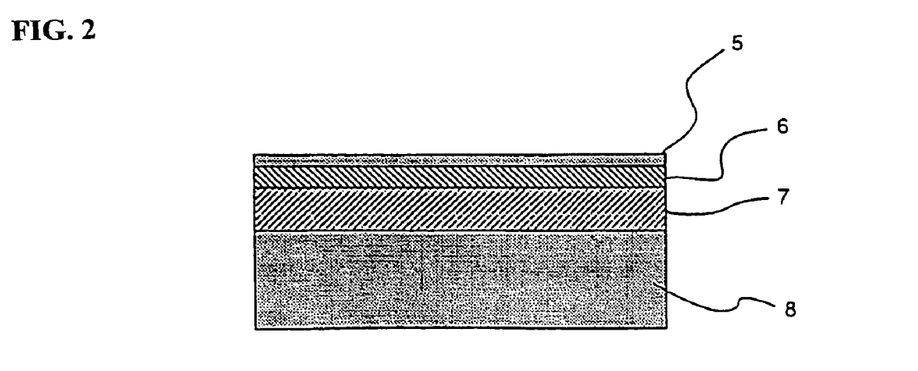
FIG. 2 is an illustrative view of the structure of an oxygen barrier film used in the hermetic package.

The oxygen barrier film used consists of 4 layers as shown in FIG. 2. The film consists of a top layer 5 of poly(vinylidene chloride), a second layer of nylon 6, a third layer of polyethylene 7 and a bottom layer of linear low density polyethylene 8, with the thickness of the layers being 5 μm, 10 μm, 25 μm, and 60 μm, respectively. As the oxygen absorbent, Ageless FX-400, ex Mitsubishi Gas Co., was used. As the oxygen detecting agent, Ageless-eye KS, ex Mitsubishi Gas Co., was used.

Figure 3:
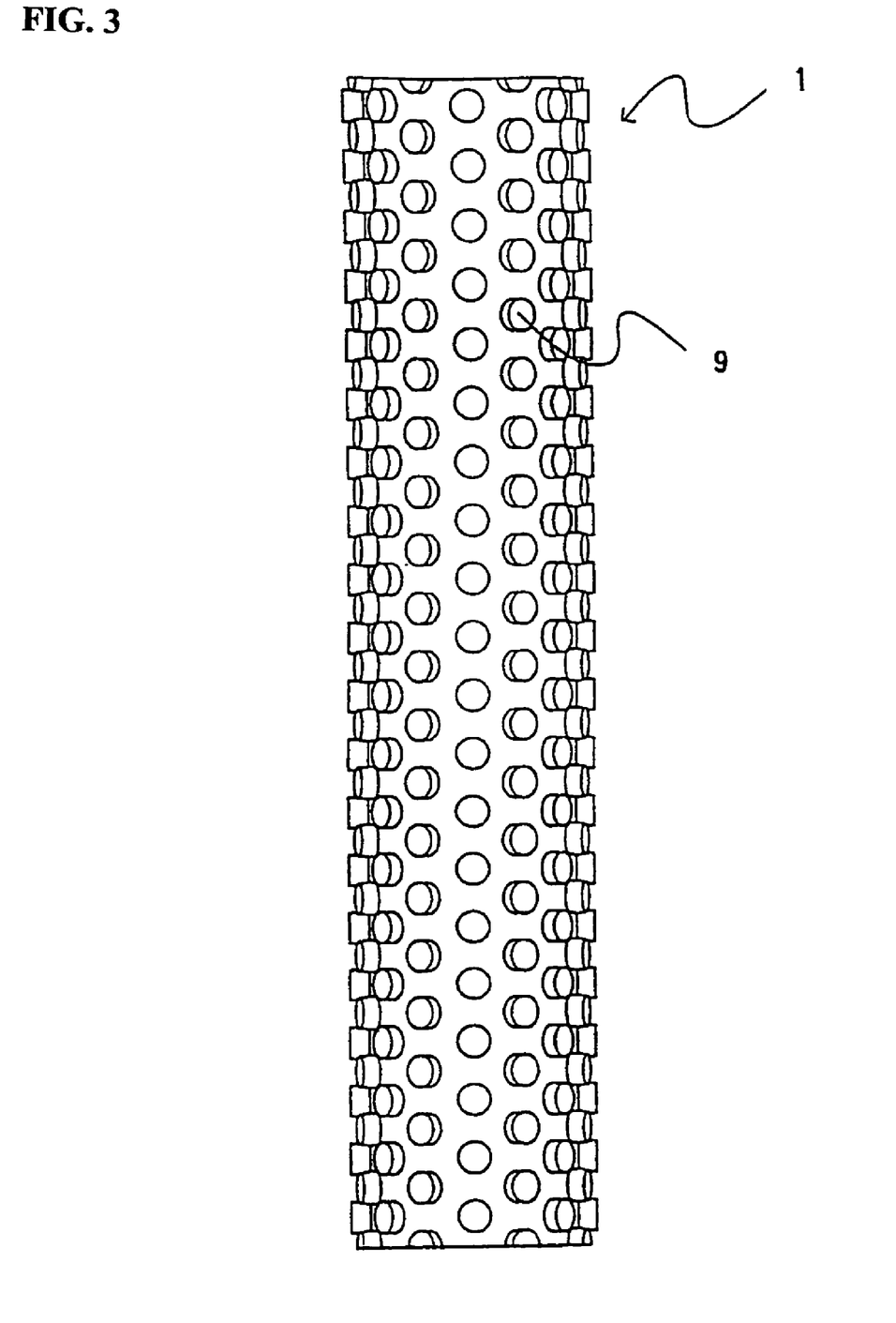
FIG. 3 is an illustrative view of the sponge roller of Example 1.
Figure 4:
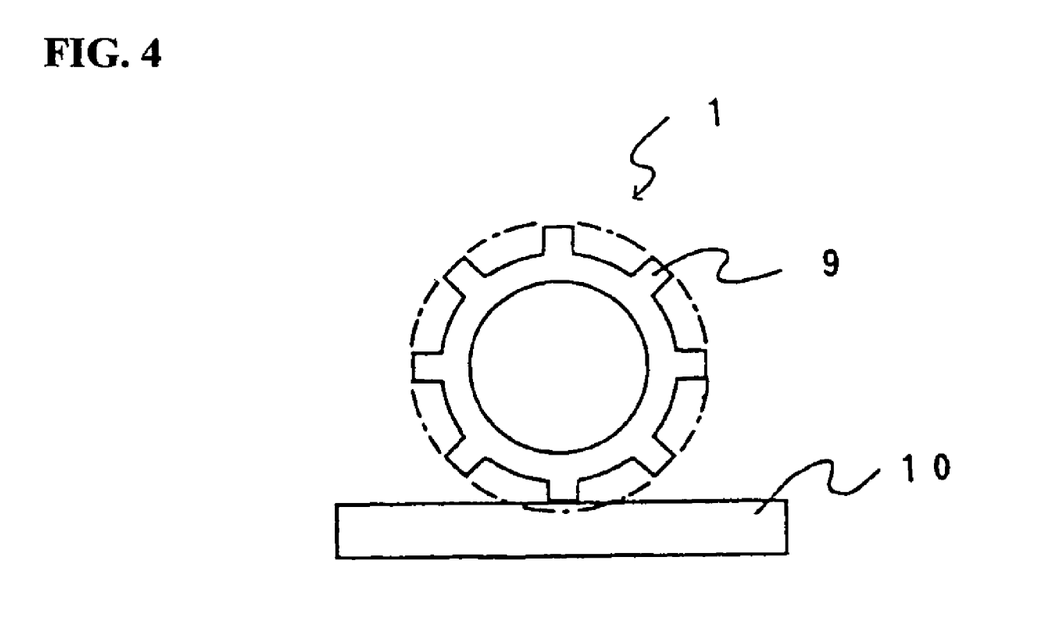
FIG. 4 is an illustrative view of washing with the brush roller of FIG. 3.

This sponge roller 1 is to be used for precision cleaning of aluminum disks or the like and, as shown in FIG. 3, has many projections 9 on its surface. As shown in FIG. 4, these projections 9 scrub and clean an object 10 to be cleaned such as aluminum disks or the like in the presence of water or the like when the sponge roller 1 is rotated.

Example 2

A PVAt sponge roller was cleaned as in Example 1. After the cleaning, the wet sponge roller was placed in a package of 450 mm by 170 mm made of a polyethylene film and the opening was heat sealed to completely sael the package. This time, no oxygen absorbent and no oxygen detecting agent were introduced. The whole package was irradiated with an electron beam. Irradiation energy was 5 MeV and the dosage was 4 kGy.

Comparative Example 1

A sponge roller of PVAt having an outer diameter of 60 mm, an inner diameter of 30 mm and a length of 254 mm was wetted with the above-mentioned pure water, but no cleaning was applied. The roller was placed in a package of 450 mm by 170 mm made of an oxygen barrier film. The oxygen detecting agent was placed in the package, but no a oxygen absorbent was used and then the opening was heat sealed. The same kind of the oxygen barrier film as used in Example 1 was used.

Comparative Example 2

A sponge roller of PVAt having an outer diameter of 60 mm, an inner diameter of 30 mm and a length of 254 mm was wetted with the above-mentioned pure water, but no cleaning was applied. The roller was placed in a package of 450 mm by 170 mm made of a polyethylene film. An oxygen absorbent and an oxygen detecting agent were also included and the opening was heat sealed. The same kinds of oxygen absorbent and the oxygen detecting agent as used in Example 1 were used.

Comparative Example 3

A sponge roller of PVAt having an outer diameter of 60 mm, an inner diameter of 30 mm and a length of 254 mm was soaked in a mixture of 3,000 cc of a 0.3 wt % aqueous solution of sodium dehydroacetate and 3,000 cc of a 0.3 wt % aqueous solution of oxalic acid and a water content of the sponge roller was made equal to that in Example 1. Then, the sponge roller was placed in the same kind of a polyethylene film package as used in Comparative Example 2 together with an oxygen detecting agent, but without an oxygen absorbent, and the package was sealed completely. The same kind of an oxygen detecting agent as used in Example 1 was used.

Comparative Example 4

A sponge roller of PVAt having an outer diameter of 60 mm, an inner diameter of 30 mm and a length of 254 mm was wetted with the above-mentioned pure water, but no cleaning was applied. The roller was placed in a package of 450 mm by 170 mm made of an oxygen barrier film. Air in the package was evacuated and then, nitrogen gas was introduced. The oxygen detecting agent was also placed in the package without an oxygen absorbent and package was sealed completely. The same kind of oxygen barrier film as used in Example 1 was used.

Comparative Example 5

A sponge roller of PVAt having an outer diameter of 60 mm, an inner diameter of 30 mm and a length of 254 mm was cleaned as in Example 1. Then, after the cleaning, the wet sponge was placed in a package of 450 mm by 170 mm made of a polyethylene film together with the oxygen absorbent and the oxygen detecting agent and the package was heat sealed completely at its opening. The same kind of a polyethylene film as used in Comparative Example 2 was used.

Comparative Example 6

A sponge roller of PVAt having an outer diameter of 60 mm, an inner diameter of 30 mm and a length of 254 mm was cleaned as in Example 1. Then, after the cleaning, the wet sponge was placed in a package of 450 mm by 170 mm made of a polyethylene film together with the oxygen detecting agent, but without an oxygen absorbent, and the package was heat sealed completely at its opening. The same kind of a polyethylene film as used in Comparative Example 2 was used.

The PVAt sponge rollers treated as described above were stored in a thermostatic room kept at 23° C. and change in appearance was observed for 200 days. Appearances of the porous rollers, i.e., the degree of mold growth was as shown in the following Table 1.

TABLE 1

| | Degree of mold growth days | | | | |
|---|---|---|---|---|---|
| | 10 days | 30 days | 60 days | 100 days | 200 days |
| Example 1 | − | − | − | − | − |
| Example 2 | − | − | − | − | − |
| Comparative example 1 | − | + | ++ | +++ | +++ |
| Comparative example 2 | − | − | + | ++ | +++ |
| Comparative example 3 | − | − | − | − | − |
| Comparative example 4 | − | − | − | + | ++ |
| Comparative example 5 | − | − | − | − | + |
| Comparative example 6 | − | − | − | + | ++ |

−: Mold growth was not detected.
+: At least 1 colony of mold was detected.
++: At least 3 colonies of mold were detected.
+++: At least 10 colonies of mold were detected.

As shown in Table 1, mold growth was prevented for at least 200 days according to the present PVAt sponge roller, the present preparing method and the present storing method in Example 1.

Also in Example 2, the irradiation of an electron beam on the packaged sponge roller prevented mold growth for at least 200 days as in Example 1. This is achieved because the irradiation with an electron beam sterilizes the sponge roller to thereby prevent mold growth even when there is a little oxygen. This means that any package which can be sealed may be used satisfactorily and it is unnecessary to use an oxygen barrier film. Further, a package and a packaging process can be simpler.

Comparative Example 3 in Table 1 shows a conventional method where a mold-proofing agent was used. Although mold did not grow, the purpose of the present invention could not be achieved.

In contrast with this, in the other Comparative Examples, no Mold-proofing agent was used. Further, in Comparative Examples 1, 2 and 4, cleaning with pure water was not applied. In Comparative Example 1, because no oxygen absorbent was included, mold grows due to residual oxygen in the packages. In Comparative Example 2, the film of the package does not have an oxygen blocking property. Accordingly, when the amount of oxygen which penetrated the film exceeded the capacity of the oxygen absorbent, mold grew. In Comparative Example 4, air in the package was replaced with nitrogen gas first and the oxygen barrier film was used. Mold could grow due to oxygen which gradually penetrated the film and no oxygen absorbent was included, though mold grew slower than in Comparative Examples 1 and 2.

In Comparative Examples 5 and 6, cleaning with pure water was carried out. In the both Examples, a polyethylene film was used but no oxygen barrier film was used. In Comparative Example 5, an oxygen absorbent was included, and accordingly the result is better than in the other Comparative Examples, but not as good as in the Examples. In Comparative Example 6, the result is worse than that of Comparative Example 5 because no oxygen absorbent was included.

Thus, to keep a PVAt sponge in a wet state without getting moldy, it is necessary to make the inside of the package for storing to be oxygen-free or at an oxygen concentration which is almost oxygen-free. For that purpose, a PVAt sponge should be hermetically packaged together with an oxygen absorbent with an oxygen barrier film according to the present invention.

As shown in the Examples, to store a PVAt sponge in a wet state, mold growth can be restrained for an prolonged period of time by cleaning the PVAt sponge with pure water and keeping it in an oxygen-free or almost oxygen-free atmosphere.

Next, the roller of Example 1 which had been stored for 200 days was subjected to the measurements of the COD, the sodium ion concentration, and the number of particles of 2.5 μm or more. The COD was 3.06 ppm; the sodium ion concentration, 1 ppm or less (i.e., less than the detection limit); and the number of particles of 2.5 μm or more, 22,800/cc. The rollers of Example 1 and Comparative Examples 1 to 4 which had been stored for 200 hours were subjected to the measurement of conductivity. The rollers were further subjected to conventional pre-cleaning with deionized water up to 4 hours. At each hour the conductivity was measured. The results are as shown in Table 2.

In the Example, the amount of the eluted components come within the allowable range in a short period of cleaning. In Comparative Examples 1,2 and 4, a longer cleaning period is necessary because cleaning with pure water was not conducted. In Comparative Example 3, the conductivity is higher due to the eluted mold-proofing agent.

TABLE 2

| | Conductivity, μS/cm Pre-cleaning time, hour | | | | |
|---|---|---|---|---|---|
| | 0 | 1 | 2 | 3 | 4 |
| Example | 0.5 | 0.1 | 0.06 | 0.06 | 0.06 |
| Comparative example 1 | 5.0 | 1.0 | 0.5 | 0.1 | 0.1 |
| Comparative example 2 | 5.0 | 1.0 | 0.5 | 0.1 | 0.1 |
| Comparative example 3 | 400 | 50 | 20 | 5 | 1 |
| Comparative example 4 | 5.0 | 1.0 | 0.5 | 0.1 | 0.1 |

Table 3 shows whether oxygen was detected or not by the oxygen detecting agents contained in the packages. In Table 3, "none" means that the oxygen concentration was 0.1% or smaller.

In Example 1, the inside of the package was kept oxygen free for a long time. In contrast with it, in the Comparative Examples, the oxygen concentration could be maintained low for a short time in some cases, but not for a long time.

TABLE 3

| | Presence of oxygen in the package days | | | | |
|---|---|---|---|---|---|
| | 10 days | 30 days | 60 days | 100 days | 200 days |
| Example 1 | No | No | No | No | No |
| Example 2 | Yes | Yes | Yes | Yes | Yes |
| Comparative example 1 | Yes | Yes | Yes | Yes | Yes |
| Comparative example 2 | No | Yes | Yes | Yes | Yes |
| Comparative example 3 | Yes | Yes | Yes | Yes | Yes |

TABLE 3-continued

| | Presence of oxygen in the package days | | | | |
|---|---|---|---|---|---|
| | 10 days | 30 days | 60 days | 100 days | 200 days |
| Comparative example 4 | No | No | Yes | Yes | Yes |
| Comparative example 5 | No | Yes | Yes | Yes | Yes |
| Comparative example 6 | Yes | Yes | Yes | Yes | Yes |

As shown in Example 1, to store a PVAt sponge in a wet state, mold growth can be restrained for a long time by cleaning the PVAt sponge with pure water and keeping it in an oxygen-free or almost oxygen-free atmosphere.

The present invention allows one to keep porous bodies oxygen-free for a long time and, therefore, can prevent change in quality of porous bodies by oxidation in addition to a mold-proofing effect. Further, the present storing method can be used to store not only porous materials or wet materials but also those which should be protected from degradation by oxidation or quality change.

In Example 2, mold growth was prevented even in the presence of oxygen as far as the package was hermetic, because the sponge was sterilized by irradiation with an electron beam.

INDUSTRIAL APPLICABILITY

The present storing method can greatly reduce the amount of eluted substances and dust from a PVAt sponge; can shorten or eliminate pre-cleaning before used; maintains the mold-proofing effect for a long time even when storing the PVAt sponge in a wet state; and prevents degradation by oxidation or deterioration because the porous material is kept oxygen free. Therefore, the present method is extremely useful.

The invention claimed is:

1. A method of storing a porous poly(vinyl acetal) resin body prepared with a high degree of cleanliness, the method comprises a step of hermetically packaging the porous resin body in a wet state with an oxygen barrier film, wherein the porous resin body has a Chemical Oxygen Demand (COD) of 5 ppm or less, a sodium ion concetration of 1 ppm or less, a conductivity of less than 5 μS/cm, and a maximum number of particles having a size of 2.5 μm or larger at 50,000/cc of the porous body.

2. The method of storing a porous poly(vinyl acetal) resin body having a high degree of cleanliness according to claim 1, wherein an oxygen absorbent is contained in the hermetic package made of the oxygen barrier film.

3. The method of storing a porous poly(vinyl acetal) resin body having a high degree of cleanliness according to claim 1, wherein the oxygen barrier film has a oxygen permeability of 200 cc/$m^2$·atm·24 hrs or smaller.

4. The method of storing a porous poly(vinyl acetal) resin body having a high degree of cleanliness according to claim 1, wherein an oxygen detecting agent is contained in the hermetic package.

5. The method of storing a porous poly(vinyl acetal) resin body having a high degree of cleanliness according to claim 1, wherein the step of hermetically packaging is carried out in an environment where a higher degree of cleanliness than Class 100 specified in the Federal Standards 209D is maintained.

6. The method of storing a porous poly(vinyl acetal) resin body having a high degree of cleanliness according to claim 1, wherein the porous poly(vinyl acetal) resin body is covered by a molded sheet article before hermetically packaging the body with a high degree of cleanliness.

7. The method of storing a porous poly(vinyl acetal) resin body having a high degree of cleanliness according to claim 1, wherein the hermetic package is further covered and sealed with a film material to provide double packaging.

8. The method of storing a porous poly(vinyl acetal) resin body of having a high degree of cleanliness according to claim 1, wherein the porous poly(vinyl acetal) resin body is a sponge roller used for cleaning.

9. A method of storing a porous poly(vinyl acetal) resin body having a high degree of cleanliness, the method comprises steps of hermetically packaging the porous poly(vinyl acetal) resin body in a wet state, wherein the porous resin body has a Chemical Oxygen Demand (COD) of 5 ppm or less, a sodium ion concentration of 1 ppm or less, a conductivity of less than 5 $\mu$S/cm, and a maximum number of particles having a size of 2.5 $\mu$m or larger at 50,000/cc of the porous resin body, and irradiating the hermetic package containing the porous resin body with an electron beam or γ-ray.

10. The method of storing a porous poly(vinyl acetal) resin body having a high degree of cleanliness according to claim 9, wherein an irradiation dosage of the electron beam or γ-ray is 10 kGy or smaller.

11. The method of storing a porous poly(vinyl acetal) resin body having a high degree of cleanliness according to claim 9, wherein an oxygen barrier film is used for a hermetic package and an oxygen absorbent is contained in the hermetic package.

12. The method of storing a porous poly(vinyl acetal) resin body having a high degree of cleanliness according to claim 11, wherein the oxygen barrier film has an oxygen permeability of 200 cc/m$^2$·atm·24 hrs or smaller.

* * * * *